Nov. 7, 1939.   J. C. PATERSON   2,179,270
ENDLESS BAND CONVEYER
Filed March 12, 1937    2 Sheets-Sheet 1
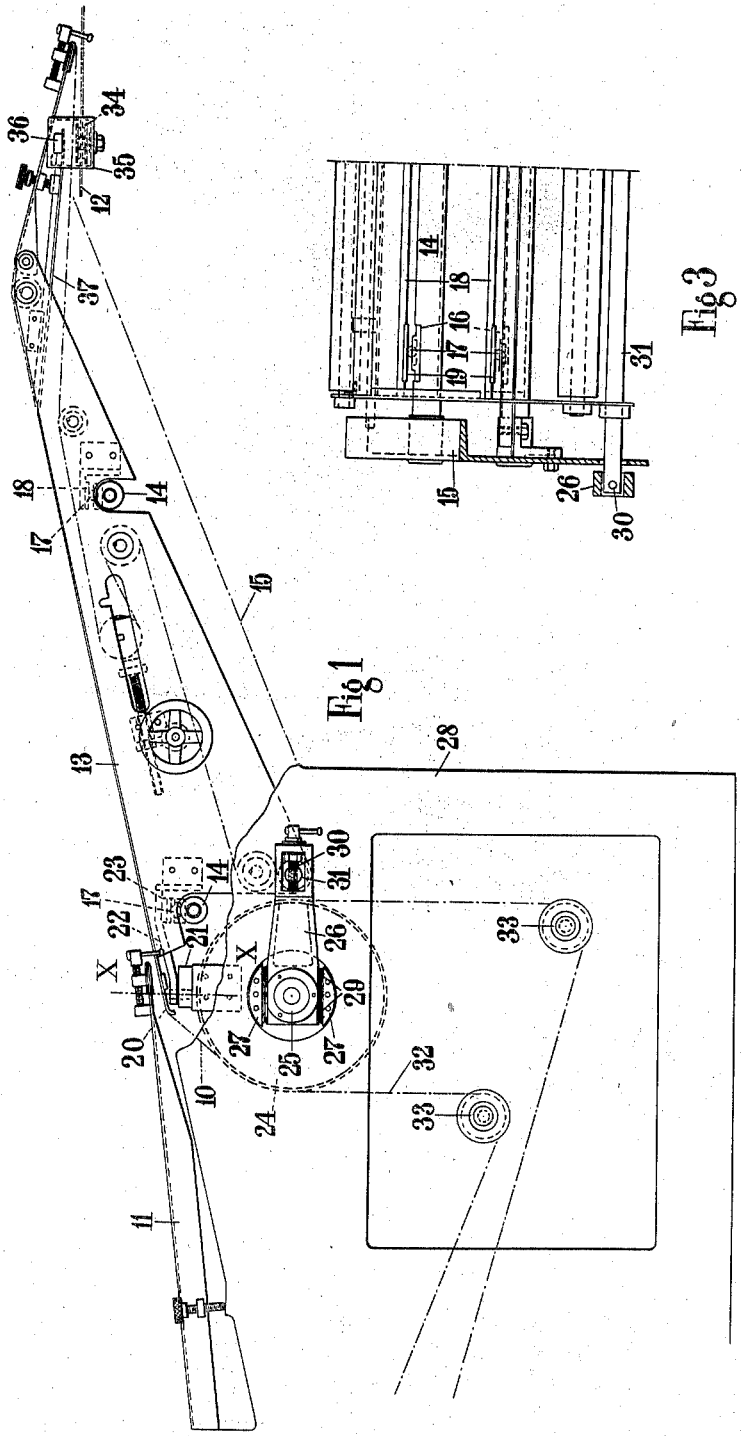
INVENTOR
JOHN CURRIE PATERSON
BY George B. Willcox
ATTORNEY

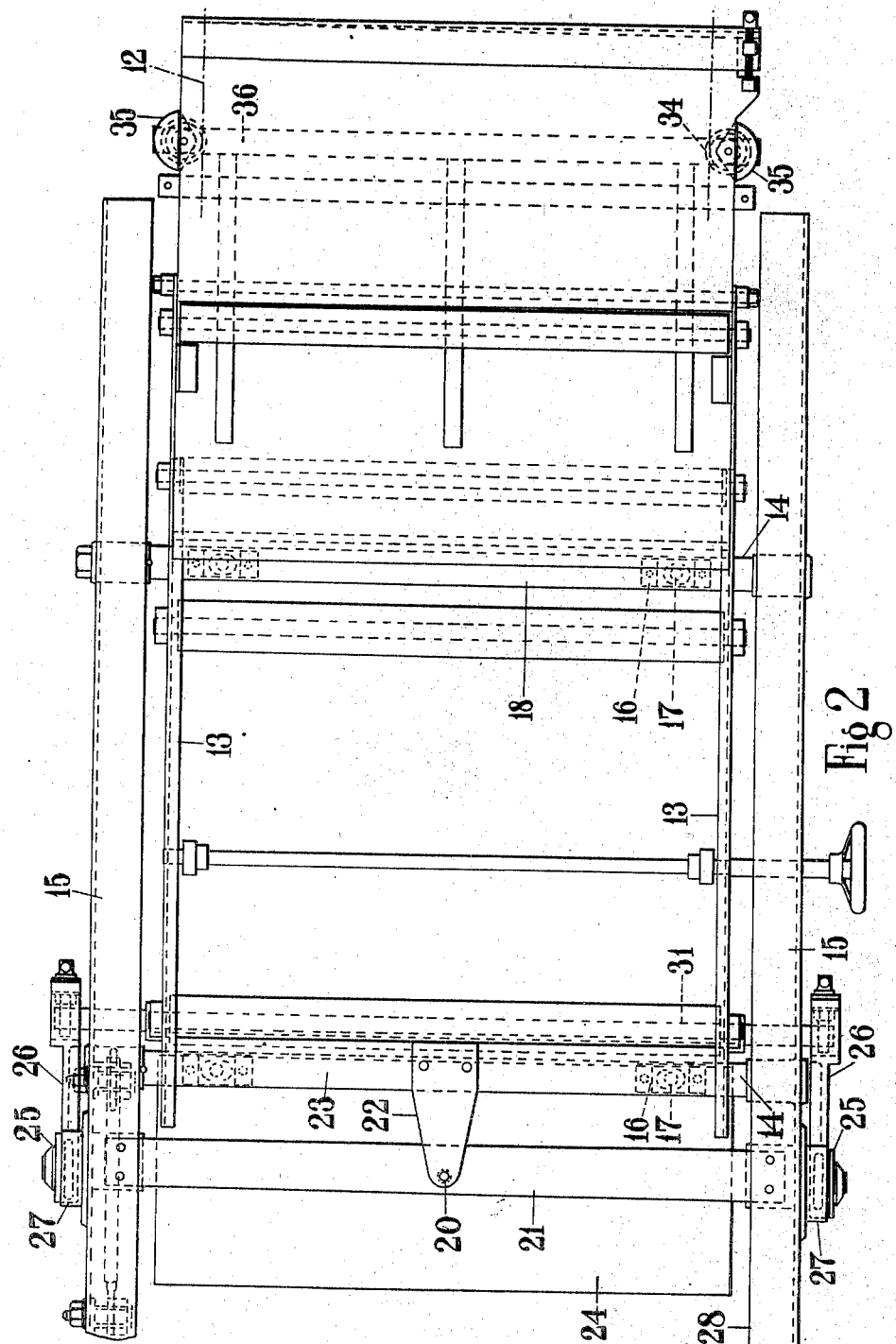

UNITED STATES PATENT OFFICE 2,179,270

ENDLESS BAND CONVEYER

John Currie Paterson, Peterborough, England, assignor to Baker Perkins Company Inc., Saginaw, Mich.

Application March 12, 1937, Serial No. 130,519
In Great Britain March 20, 1936

6 Claims. (Cl. 198—29)

This invention relates to endless band conveyers and is especially applicable in connection with the endless steel bands of continuously travelling ovens used for baking biscuits and the like.

Endless steel band conveyers such as are employed for continuous biscuit ovens require very careful adjustments when installing to ensure their exact tracking on their rollers. When properly adjusted there is little or no deviation of the band as a whole but it is found that all points of their edge do not follow a rectilinear path owing to the fact that the edges of the endless band are not themselves truly rectilinear or that the junction of the band when producing the endless form cannot be made so that all points on the edges of the laps run in the same vertical plane.

Consequently, for example, where a wire or web conveyer is feeding dough shapes onto the end of a steel band oven there is difficulty in ensuring that the shapes are constantly placed on the steel band in the most appropriate position. If the outer dough shapes of the rows are placed too far from the edge of the steel band, there is a liability for these to become overbaked or burnt, while if placed so close to the edge of the band so as to overlap it, the biscuits may become distorted.

The best baking effects are secured when the dough shapes are evenly distributed over the steel band area. Similarly, where for example a steel band oven discharges to stacking means, the accuracy of the delivery line may be important.

It will be appreciated that similar alignment difficulties may arise with conveyers other than steel bands when working in tandem.

The aim of the invention is to provide means adapted to overcome the above difficulties by maintaining alignment between two conveyers in tandem irrespective of edge irregularities or lateral displacement.

The invention consists in providing means engaging or affected by one conveyer and imparting through said means to the other conveyer relative lateral displacements directly or through a relay.

For this purpose taking the example of a dough shape conveyer feeding to a steel band oven, the dough conveyer may be carried by a frame which is pivoted on a vertical axis at its end remote from the steel band and supported towards its end adjacent the steel band on balls or rollers on a track so that it may oscillate laterally about its pivot.

Where the conveyer receives goods from another conveyer the pivot of the receiving conveyer should be as closely adjacent to the delivery point as convenient.

The means for imparting the movements of the steel band to the dough conveyer may comprise arms on the dough conveyer frame carrying rollers on vertical axes which engage each edge of the steel band, so that any deviations of the edges of the steel band cause a corresponding or correcting movement of the dough conveyer frame and its conveyer about the pivotal axis.

Further features of the invention will be hereinafter described and defined in the claims.

In the accompanying drawings:

Figure 1 is a side elevation of a panning mechanism for delivering dough shapes to an endless oven band according to the invention.

Figure 2 is a plan corresponding thereto; and

Figure 3 is a sectional elevation.

In carrying the invention into effect according to one convenient mode, as applied to the feeding of dough shapes from a cutting machine to a steel band oven conveyer, a panning conveyer 10 is located in position to receive dough shapes from the cutting machine conveyer 11 and deliver them to the steel band conveyer 12. The panning conveyer is mounted upon a framing 13 which is capable of oscillation about a vertical axis $x$—$x$ adjacent the delivery edge of the cutting machine conveyer, i. e. at the end of the panner remote from the oven band. The framing of the panning conveyer is supported upon a pair of stretcher bars 14 which are bolted to extensions 15 of the main frame between which the panning conveyer is located. The stretcher bars 14 have seatings 16 adjacent their ends which accommodate steel balls 17. The panner frame 13 is provided with cross-bars 18 and 23 secured to the side plates of the panner frame, these bars being provided with steel inserts 19 for engagement by the balls 17 (see Fig. 3). By this mounting of the panner frame it may be readily oscillated laterally about the pivotal axis $x$—$x$.

The pivotal axis $x$—$x$ of the panner frame is provided by a vertically extending pin 20 which is carried by a cross-bar 21 fixed to the extensions 15 of the main side frames 28, the pin 20 engaging in an aperture in a plate 22 disposed in the longitudinal axis of the panner framing and carried by the bar 23 fixed to such framing.

The driving drum 24 for the panner conveyer 10 is supported in end bearings 25 carried by adjustable arms 26 which are located between housing members 27 fixed upon the main frame 28 of the machine. Suitable bearings 29 are provided between the arms 26 and the housings 27 whereby the arms may be adjusted in a horizontal plane relatively to the housings. The arms 26 are provided with adjusting screws 30 which screw in the ends of a bar 31 rigidly mounted upon the panner frame, the arrangement being such that by an adjustment of the screws the axis of the drum 24 may be adjusted relatively to the panner framing.

The driving drum 24 is driven by a chain and sprocket drive and in order to avoid any pull of the chain being transmitted to the panner framing the sprocket chain 32 is guided in a vertical direction over guide pulleys 33.

At the end of the panner adjacent the steel oven band 12 and disposed adjacent the sides of the panner framing is a pair of guide pulleys 34 which are mounted in housings 35 carried by a cross-bar 36 supported upon the forward end 37 of the panner framing. The guide pulleys 34 are adapted to engage each side of the steel oven band 12 so that according to the deviation in the path of the edges of the steel oven band the guide pulleys will impart a lateral correcting movement to the panner about the pivotal axis $x$—$x$ so that the delivery edge of the panner conveyer will always be maintained in the correct position relative to the oven band for the deposit of the dough shapes thereon.

Having now described my invention what I claim as new and desire to secure by Letters Patent is:

1. In a conveyer assembly comprising a panning conveyer and an oven conveyer band to which the panning conveyer delivers, in combination, a mounting for the panning conveyer whereby the panning conveyer is oscillatable about a vertical axis, means operatively connected to the panning conveyer and engaging the oven band so as to impart lateral oscillatory movement to the panning conveyer about said axis on deviation of the oven band.

2. Apparatus as claimed in claim 1 wherein the means operatively connected to the panning conveyer comprises rollers engaging each edge of the oven band, whereby any deviation of the edges of the oven band causing a correcting movement of the panning conveyer.

3. Apparatus as claimed in claim 1 wherein the panning conveyer is mounted in a frame having spaced transverse members which are supported by spaced elements through anti-friction balls.

4. Apparatus as claimed in claim 1 wherein the panning conveyer comprises a frame, an endless apron travelling over a driving drum, said drum being mounted in arms adjustably connected to said frame and guided horizontally in a stationary framework.

5. Apparatus as claimed in claim 1 wherein the panning conveyer comprises a frame, an endless apron travelling over a driving drum, said drum being mounted in arms adjustably connected to said frame and guided horizontally in a stationary framework, and wherein said drum is driven by a sprocket chain having vertical extending laps, whereby lateral thrust on the drum is avoided.

6. In apparatus for delivering biscuits or like articles comprising two band conveyers arranged in tandem, in combination, a frame carrying one of said conveyers pivoted for oscillatory motion about a vertical axis, and means operatively connected to said frame and engaging the lateral edges of the other conveyer operatively arranged to impart relative lateral displacements to the first conveyer in response to lateral deviations of said other conveyer to maintain the lateral placement of the biscuits as they are transferred from one conveyer to the other.

JOHN CURRIE PATERSON.